United States Patent
Gray et al.

(10) Patent No.: US 6,719,320 B2
(45) Date of Patent: Apr. 13, 2004

(54) CONTROLLED TETHER ARRANGEMENT FOR AN AIRBAG

(75) Inventors: John D. Gray, Union, NH (US); Bruce Batchelder, Rochester, NH (US); Jim Rogers, Berwick, ME (US); Ray Evans, Madbury, NH (US); Ulrich Weissert, Rochester, MI (US)

(73) Assignee: Collins & Aikman Automotive Company, Inc., Troy, MI (US)

( * ) Notice: Subject to any disclaimer, the term of this patent is extended or adjusted under 35 U.S.C. 154(b) by 0 days.

(21) Appl. No.: 10/286,251

(22) Filed: Nov. 1, 2002

(65) Prior Publication Data

US 2003/0184058 A1 Oct. 2, 2003

Related U.S. Application Data

(60) Provisional application No. 60/367,924, filed on Mar. 27, 2002, and provisional application No. 60/368,418, filed on Mar. 28, 2002.

(51) Int. Cl.[7] ............................................... B60R 21/20
(52) U.S. Cl. ................................................... 280/728.3
(58) Field of Search ........................... 280/728.3, 728.2, 280/728.1, 732, 743.2

(56) References Cited

U.S. PATENT DOCUMENTS

| | | |
|---|---|---|
| 4,911,471 A | 3/1990 | Hirabayashi |
| 5,150,919 A | 9/1992 | Sakakida et al. |
| 5,211,421 A | 5/1993 | Catron et al. |
| 5,308,106 A * | 5/1994 | Heidorn .................. 280/728.3 |
| 5,332,257 A | 7/1994 | Rogers et al. |
| 5,460,401 A | 10/1995 | Gans et al. |
| 5,533,746 A | 7/1996 | Whited |
| 5,564,731 A | 10/1996 | Gallagher et al. |
| 5,564,733 A | 10/1996 | Duenas et al. |
| 5,647,607 A | 7/1997 | Bolieau |
| 5,685,930 A | 11/1997 | Gallagher et al. |
| 5,765,862 A | 6/1998 | Bentley |
| 5,804,121 A | 9/1998 | Gallagher |
| 5,902,428 A | 5/1999 | Gallagher et al. |
| 5,941,558 A | 8/1999 | Labrie et al. |
| 5,975,563 A | 11/1999 | Gallagher et al. |
| 6,203,056 B1 | 3/2001 | Labrie et al. |
| 6,302,437 B1 * | 10/2001 | Marriott et al. ............. 280/732 |
| 6,318,752 B1 | 11/2001 | Warnecke et al. |
| 6,467,800 B1 | 10/2002 | Bey et al. |
| 6,517,103 B1 * | 2/2003 | Schneider ................. 280/730.1 |
| 6,533,312 B1 * | 3/2003 | Labrie et al. ............ 280/728.2 |
| 2002/0084632 A1 | 7/2002 | Bey et al. |

* cited by examiner

Primary Examiner—Paul N. Dickson
Assistant Examiner—Faye M. Fleming
(74) Attorney, Agent, or Firm—Grossman, Tucker, Perreault & Pfleger, PLLC

(57) ABSTRACT

An airbag door construction for airbag deployment comprising a hard instrument panel having a weakened area outlining at least a portion of an integrally molded airbag door. A reaction plate is attached to the underside of the panel at the airbag door location. A deployment chute is molded with the reaction plate and attached to the hard instrument panel just outboard of the outline of the airbag door. A tether is included that engages with the reaction plate whereupon airbag deployment the tether allows the airbag door/reaction plate welded combination to break loose from the hard instrument panel in a controlled manner.

6 Claims, 10 Drawing Sheets

CONTROLLED TETHER ARRANGEMENT FOR AN AIRBAG

CROSS REFERENCE TO RELATED APPLICATIONS

This application claims priority to U.S. Provisional Application No. 60/367,924 filed Mar. 27, 2002 and U.S. Provisional Application No. 60/368,418 filed Mar. 28, 2002.

FIELD OF INVENTION

The present invention relates to airbag door constructions for vehicles and, more particularly, to hinging and retention of the door through the use of a tether design that controllably tensions upon airbag deployment.

BACKGROUND OF THE INVENTION

Nearly all motor vehicles today are provided with inflatable restraint systems to protect both the driver and passengers in the event of a collision. The airbag system for the passenger side of the vehicle generally includes an inflator and reaction canister located behind the instrument panel and the airbag inflates through an opening in the panel. That opening may be covered by a rectangular shaped door that is flush mounted in the opening and is moved out of the way on a hinge or tethers by the deploying airbag. In newer applications, the door that covers the opening may be "invisible" to the occupants of the vehicle, that is, hidden behind a surface covering of skin and foam which is pre-weakened by a groove formed on the backside of the skin layer to allow a predictable tearing of the skin. A separate door substrate is located beneath the skin and foam layers and is hinged or tethered to the instrument panel or canister to control door opening.

Vehicles such as small trucks, SUV's and small to medium sized cars often will use a hard panel construction, i.e., without a separate soft skin and padded foam layer, to reduce cost. In these cases, a separate airbag door, instrument panel and door chute may be assembled over the canister. To control the path of the airbag as it expands, a deployment chute transitions the space between the canister where the bag is stored and the back of the airbag door to assure that the bag does not expand in an undesirable direction. Use of a hard door separate from the remainder of the instrument panel may allow replacement of only the door portion after a low speed deployment, as the remainder of the instrument panel may not be damaged. In still other applications, the hard instrument panel and door may be formed of unitary construction with a pre-weakened seam of reduced cross-section formed on the underside of the panel, outlining the periphery of the airbag door. Hinges, tethers, reinforcements and chutes are then post-attached to the molded hard panel. This is a preferred construction as aesthetics are enhanced (no visible seam) and cost is reduced (a single molding rather than multiple components assembled together).

Additionally, it is known in the art to use both hinges and tethers to control the opening and travel of the door or door substrate. In U.S. Pat. Nos. 5,685,930; 5,564,731; 5,804,121; 5,902,428 and 5,975,563 to Gallagher, et al. and commonly assigned to the assignee of the present invention and included herein by reference, a molded motor vehicle instrument panel made of thermoplastic material having an integral airbag deployment door for a passenger side airbag that is defined by a tear seam and normally retained by an integral flexible mounting/hinge flange is disclosed.

In U.S. Pat. Nos. 5,685,930 and 5,902,428 the door is retained by a supplemental tethering hinge which is formed separately from the panel and attached by welding or an adhesive. The supplemental tethering hinge contains a loop or fold 63 as slack to let the door separate and move controllably away from the instrument panel to allow the bag to expand through the opening.

In U.S. Pat. Nos. 5,564,731 and 5,975,563 the flexible tethering hinge is described as being of sheet material, thermosetting, thermoplastic, metal mesh or woven fabric of plastic or natural fibers and attached by mechanical fasteners or hot staked bosses on the inner side of the door portion.

U.S. Pat. Nos. 5,975,563 and 5,804,121 are directed at an integral mounting hinge/flange on which is formed a bonded layer of second plastic material on one side of the flange and on the inner side of a potentially frangible portion of the door. The second plastic material has the physical characteristic of remaining ductile at low temperatures at which the instrument panel plastic material becomes brittle and as a result, the bonded layer forms a tether to retain the door in a controllable manner as it separates from the instrument panel when the airbag is deployed.

In U.S. Pat. No. 5,765,862 to Autoliv ASP, Inc. an inflatable airbag assembly mounted in a rectangular opening in the vehicle instrument panel is disclosed having bracket means, a plurality of thermoplastic resin fasteners and an integrally formed tether support bar 18 for a tether 20 that is connected between the door 14 and a bracket 22, on airbag module 16.

U.S. Pat. No. 5,533,746 to Morton International recites a cover for covering an opening in a panel adjacent to an airbag inflation system comprising a tether attachment element having a first portion sandwiched between said inner (metal) and outer substrates and second portion exposed for attachment to a tether and at least one tether having a loop at an outer end portion of said tether attachment element and having an inner end portion adapted for fixed attachment to limit the amount of movement of said cover away from the opening deployment of the airbag inflation system. The tether may comprise a loop and the attachment element may be an elongated metal rod. The attachment element (rod) has a series of U-shapes that extend between the door inner and outer back to a flexible tether that is looped in its undeployed condition.

U.S. Pat. No. 5,332,257, also to Morton International, discloses a tether having first and second ends, the first end being secured to said module cover (on the B-side), and the second end forming a loop, a retainer rod extending through said loop and a channel enclosing said retainer rod and loop in a fixed position to anchor said tether.

U.S. Pat. No. 5,211,421 to G. M., discloses a tether that is on the A-side of an airbag door, between substrate and foam layer which is fastened to a bracket on the canister.

All of these references use numerous components in an attempt to accomplish their objectives resulting in added material and manufacturing costs. Separate door, chute, tether, fastener and reinforcement materials are combined with a myriad of attachment processes to form an assembly that may be installed in the instrument panel.

It is therefore an object of this invention to provide a tether for an airbag door that has a controlled slack such that the slack tensions, in a controlled manner, to retain the airbag door which has been integrally formed in the hard instrument panel upon airbag deployment.

More specifically, it is a further object to provide a tether for an airbag door that is secured between the airbag door and a deployment chute wherein the airbag door is integrally formed in a hard plastic molded instrument panel and wherein a deployment chute and a door reaction plate are welded to the underside of the instrument panel in the area of the airbag door.

It is a still further object of this invention to provide a tether that attaches indirectly to an airbag door by attaching to a reaction plate which is fastened to the airbag door, thus providing the result that the fasteners for the tether will not be evident on the show surface of the airbag door.

These and other objects, advantages and features of the present invention will become more apparent form the following description and accompanying drawings.

SUMMARY OF THE INVENTION

An airbag door construction for airbag deployment comprising a hard instrument panel having an integrally formed airbag door, said airbag door having an area of reduced cross-section outlining at least a portion of the periphery thereof. A reaction plate is attached to the underside of said panel at said airbag door location. A deployment chute is attached to the underside of said panel, said deployment chute attached to said panel in at least a portion of an area lying just outside of said area of reduced cross-section. A tether assembly is included wherein said assembly comprises a tether having two ends wherein the first end engages said reaction plate and the second end engages said deployment chute, whereupon airbag deployment said airbag door and said reaction plate may at least partially detach from said instrument panel and be retained by said tether. The engagement of the tether with the reaction plate may comprise several different options including passing said tether around said reaction plate to attach to itself. The tether may also be riveted to the reaction plate. In addition, the reaction plate may include a reinforcement plate. Furthermore, the reaction plate may include ribs and a rod within said ribs of said reaction plate and the tether is attached to the rod. The second end of the tether is secured to limit travel of the airbag door upon deployment. This may include securing of the second end to the deployment chute, e.g., by a fastener or by insert molding or by wrapping the tether around a rod located outside of the deployment chute.

In alternative embodiment, the present invention may comprise a molded instrument panel made of a commercially available plastic material which has an integrally formed airbag door, a separately formed deployment chute and door reaction plate combination welded to the backside of the panel and a tether or tethers which connect the airbag door/reaction plate to the deployment chute/instrument panel to controllably retain the airbag door upon airbag inflation. The airbag door periphery is defined by a weakened tear seam which may be of reduced cross-section formed or cut into the underside of the instrument panel or alternatively may comprise a series of shallow holes or slots defining the airbag door shape. One end of the flexible tether is connected to the deployment chute near the forward (in-car) edge of the airbag door, the other end of the tether is fastened to the reaction plate which has been welded to the backside of the airbag door. Thus, an efficient design for airbag deployment is provided with no visible seam for an airbag door and having no opening formed until the airbag deploys. The panel is substantially comprised of two major plastic molded components, the hard surface instrument panel and a deployment chute/door reaction plate which are welded to the backside of the panel in the area of the airbag door.

In a further embodiment the present invention provides an airbag door construction for a hard instrument panel for a motor vehicle wherein a tether comprises a flexible strip or strips of material which are riveted between the outside of a reaction plate and a metal reinforcement plate at one end to hold the tethers to the reaction plate. A metal washer or H-shaped plate is positioned between reinforcing ribs of the reaction plate such that the plastic reaction plate and flexible tether are positioned between the metal reinforcement plate and the metal washers and riveted together. The tether is connected at the other end to an airbag deployment chute. The reaction plate is welded to the backside of the hard instrument panel in the area of the airbag door.

In another embodiment, the flexible strip of tether material passes through ribs of reduced height in the reaction plate, between the reaction plate and airbag door, such that the tether passes completely around the reaction plate attaching at one end back onto itself. The other end of the tether is then secured to limit travel of the airbag door.

In still another embodiment, the tether is wrapped around a rod which is slidably contained between ribs in the reaction plate, the other end again secured to limit travel of the airbag door. The reaction plate may optionally include a slot for the tether to pass through to engage the rod. In a still further embodiment, the tether is riveted to the outside of the reaction plate. The tether in each of the aforementioned embodiments may be of metal, plastic, fiberglass or natural fibers, and the tether may include a loop for creating slack.

PREFERRED EMBODIMENTS

Figure 1:
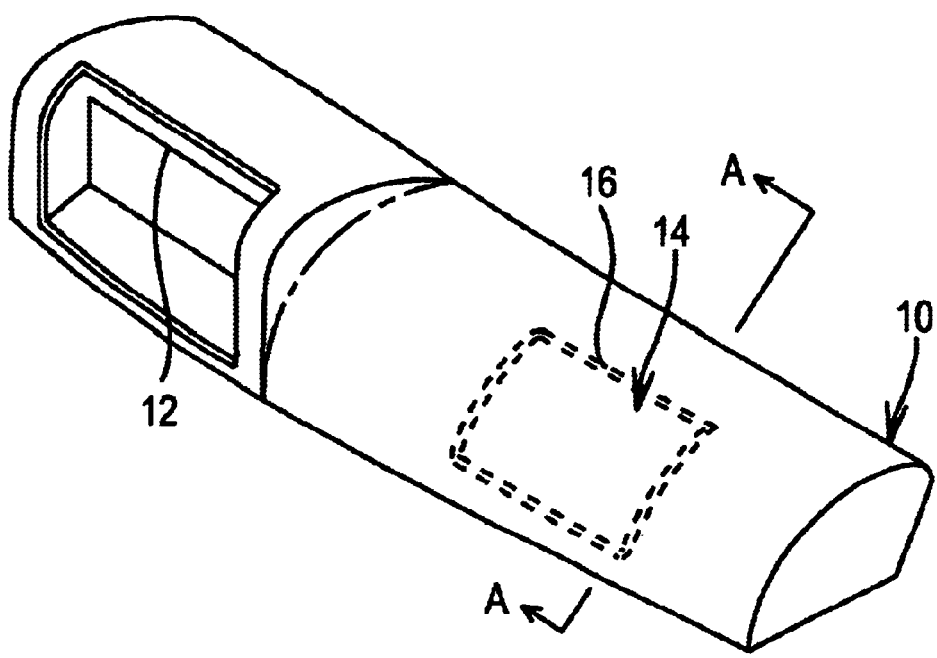
FIG. 1 is a perspective view of a motor vehicle instrument panel including an airbag door with a tether according to the present invention as installed in a motor vehicle over an airbag system.

The present invention addresses the deficiencies of the prior art by providing a tether for an invisible airbag door preferably formed in a hard plastic instrument panel wherein the tether is preferably secured at one end to a molded deployment chute and at its other end to an airbag door/reaction plate. The tether thus may act to control the path of the airbag door should it break loose from the instrument panel upon airbag inflation.

Turning to a description of the invention in connection with the figures, for elements common to the various embodiments of the invention, the numerical reference character between the embodiments is held constant, but distinguished by the addition of an alphanumeric character to the existing numerical reference character. In other words, an element referenced at 10 in the first embodiment is correspondingly referenced at 10A, 10B and so forth on subsequent embodiments. Thus, where an embodiment description uses a reference character to refer to an element, the reference character applies equally, as distinguished by alphanumeric character, to the other embodiments where the element is common. Furthermore, it should be appreciated that the various features of all of the preferred embodiments herein may be used between such embodiments, in the sense that each preferred embodiment may preferably incorporate features of another particular preferred embodiment.

Referring to FIG. 1, there is illustrated a hard plastic molded instrument panel 10 as installed in a motor vehicle. The instrument panel 10 has an opening 12 on the driver's side for the installation of an instrument cluster (not shown) and an airbag deployment door 14 of desired shape, in this case rectangular, on the passenger's side whose entire or partial perimeter is defined by a frangible tear seam 16 molded or cut into the underside of the instrument panel. The tear seam is preferably invisible to the occupants of the vehicle for reasons of aesthetics, and thus is shown in FIG. 1 by dashed lines, but may be alternately formed in the top Class A surface of the panel, or alternately in both the top and bottom surfaces of the molded panel. The panel is generally molded of a somewhat ductile plastic and the frangible tear seam 16 represents a thinned area of reduced cross-section which may include a series of shallow holes or slots which fracture due to the pressure of the inflating airbag, allowing the airbag door to break loose from the instrument panel predictably and without fragmentation.

Figure 2:
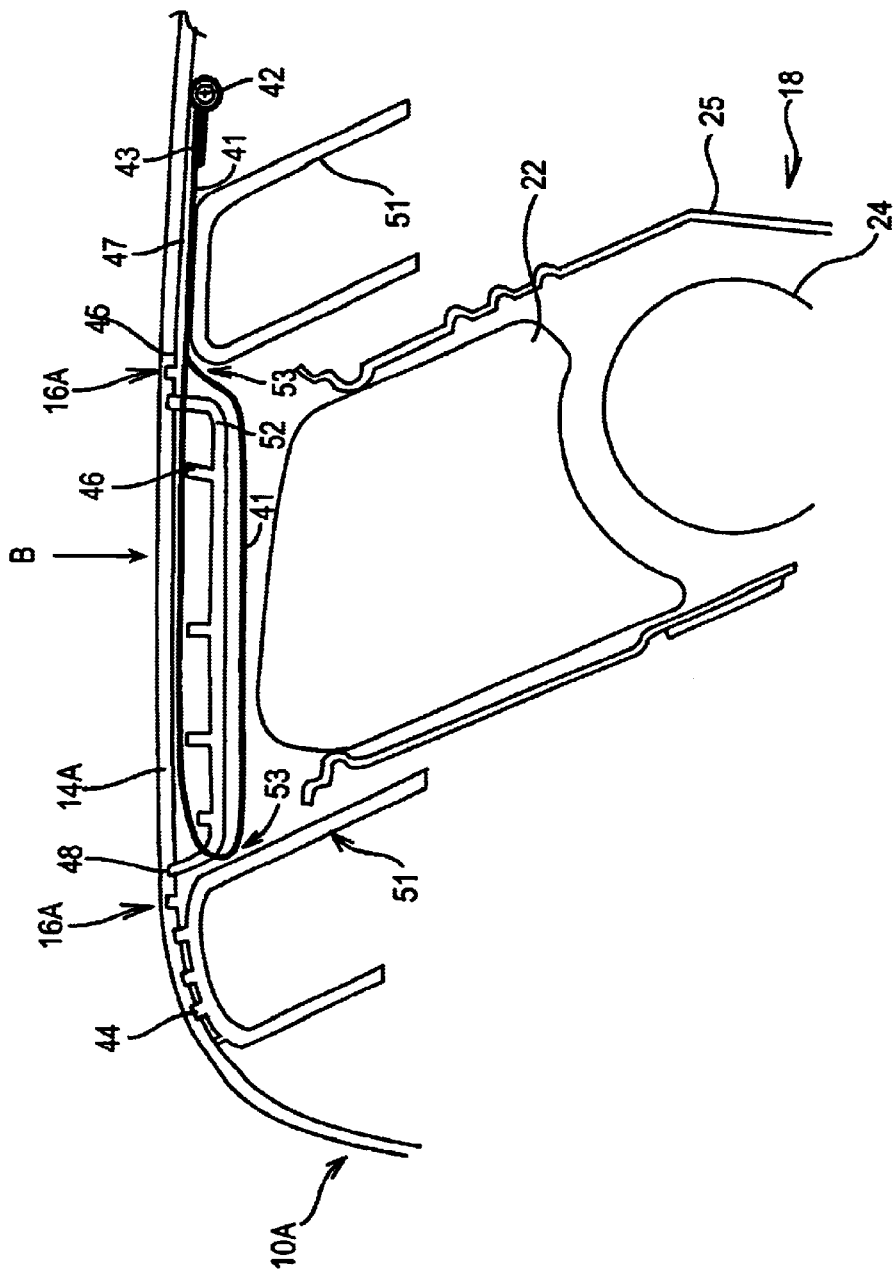
FIG. 2 is an enlarged sectional view taken along line A—A of FIG. 1 illustrating one embodiment of the present invention.

As shown in sectional view in FIG. 2, taken at line A—A of FIG. 1 looking in the direction of the arrows, a hard instrument panel 10A covers an airbag system 18 that is located behind the instrument panel directly beneath the airbag door 14A and is mounted to a metal portion of the vehicle structure (not shown). The airbag system is a conventional type that includes an inflatable folded airbag 22, an inflator 24, canister 25 and an impact sensor (not shown) that on vehicle impact triggers ignition of the inflator to inflate the airbag for deployment into the passenger space directly in front of a passenger seated on that side of the vehicle. As further shown in FIG. 2 a plastic deployment chute 51 is attached at 44, preferably as shown via vibration welding, to the backside of the instrument panel 10A just outboard of the frangible tear seam 16A in the area of the airbag door 14A to direct the airbag and create sufficient structure in the panel to direct the force of the inflating bag into the pre-weakened tear seam 16A surrounding the airbag door 14A. The deployment chute 51 is shaped to conform to the periphery of the airbag door 14A and is preferably welded to the instrument panel 10A. A reaction plate 52 which contains stiffening ribs 46 is similarly and preferably welded at 48 to the airbag door 14A backside to provide stiffness. The deployment chute and reaction plate are preferably molded of a plastic compatible with the instrument panel 10A and are welded to the backside of the instrument panel so that the tear seam 16A is located in line with the chute inner periphery 53. The reaction plate 52 is attached to the airbag door section 14A of the molded hard instrument panel 10A such that on airbag deployment the welded airbag door/reaction plate combination separates from the instrument panel/deployment chute welded assembly. As the airbag 22 expands to fill the area inside the deployment chute 51, the bag contacts the reaction plate 52 and forces the welded reaction plate 52/airbag door 14A to fracture at the tear seam 16A.

Various plastic materials may be molded to form both the instrument panel with integral airbag door and the deployment chute/reaction plate including, but not limited to, acrylonitrile-butadiene-styrene, polycarbonate, polyurethane, polyamide, styrene maleic anhydride, polypropylene, polyolefin, thermoplastic olefin, thermoplastic elastomer, polyphenylene oxide and combinations thereof.

Attachment of the reaction plate and deployment cute is preferably by vibration welding of the molded chute/plate to the instrument panel but may include other welding methods and attachment means.

As shown in FIG. 2, a tether 41 or tethers are initially passed between the chute 51 and panel 10A and secured to the reaction plate 52. In this manner, the tether 41 is slidably engaged between the panel 10A and the chute 51. Upon deployment, the tether can therefore slide a sufficient amount so that the door and the reaction plate clear the panel. In this manner, the tether is controlled in its deployment by the feature of being slidably located between the panel 10A and chute 51, yet it is substantially restricted in a vertical plane, as well as cross-car. In fact, the restriction cross-car is augmented by the fact that there can be a depression in the chute (not shown) in which the tether rests.

FIG. 2 goes on to illustrate that in addition to the above, one end of the tether is ultimately wrapped around a rod 42 and attached to itself at 43 preferably by stitching to secure that end of the tether to the deployment chute. In this manner, the tether will limit the travel that the air bag door will undertake during deployment and operates to prevent the air bag door from traveling freely within the passenger compartment.

Figure 2A:
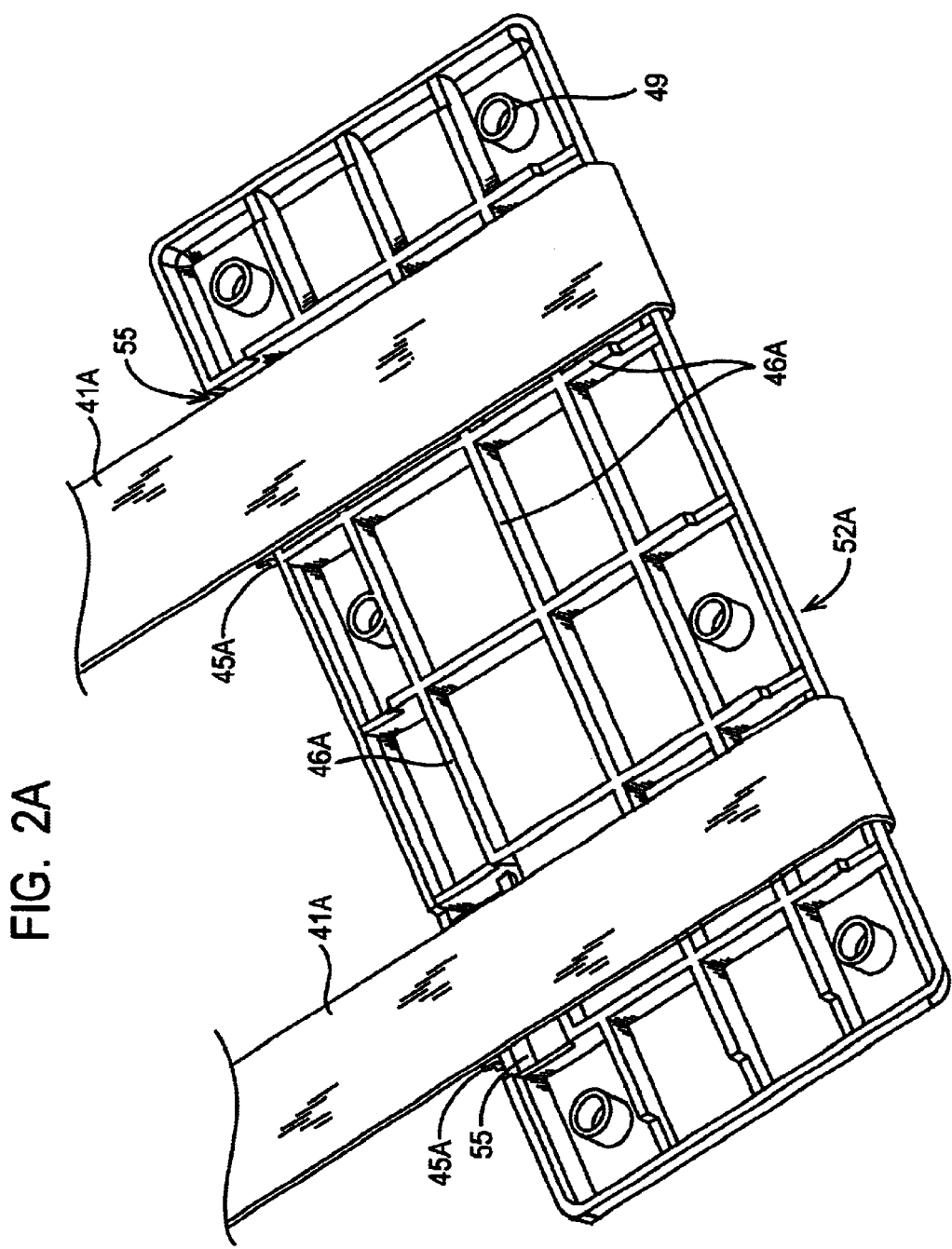
FIG. 2A is a plan view of the reaction plate of FIG. 2 taken in the direction of Arrow B.

As noted above, the tether 41 is preferably located by a depression in the deployment chute at 47 and at its other end wraps around the reaction plate 52 attaching back to itself at 45, again by preferably stitching. FIG. 2A is a plan view of the inside of the reaction plate 52A looking in the direction of Arrow B in FIG. 2, with the air bag door section 14A of the panel removed. The reaction plate 52A is preferably molded with a number of ribs 46A and bosses 49 for stiffening and attachment purposes, including ribs having a reduced height 55 to allow the tether to pass cleanly through. The reduced height ribs 55 align with the depressions 47 in the deployment chute. Thus, the tether 41A passes completely around the reaction plate 52A in one or more strips and retains the welded reaction plate 52/airbag door 14A when it breaks loose from the instrument panel 10A due to the inflating airbag 22. The rod 42 is preferably metal but may be of any material that resists the tether 41A from being pulled through the slots formed by the reduced height ribs 55 of the reaction plate and the airbag door 14A. The tether may be of metal, cloth, woven or unidirectional fibers, or plastic but preferably is a woven nylon mesh.

Figure 2B:
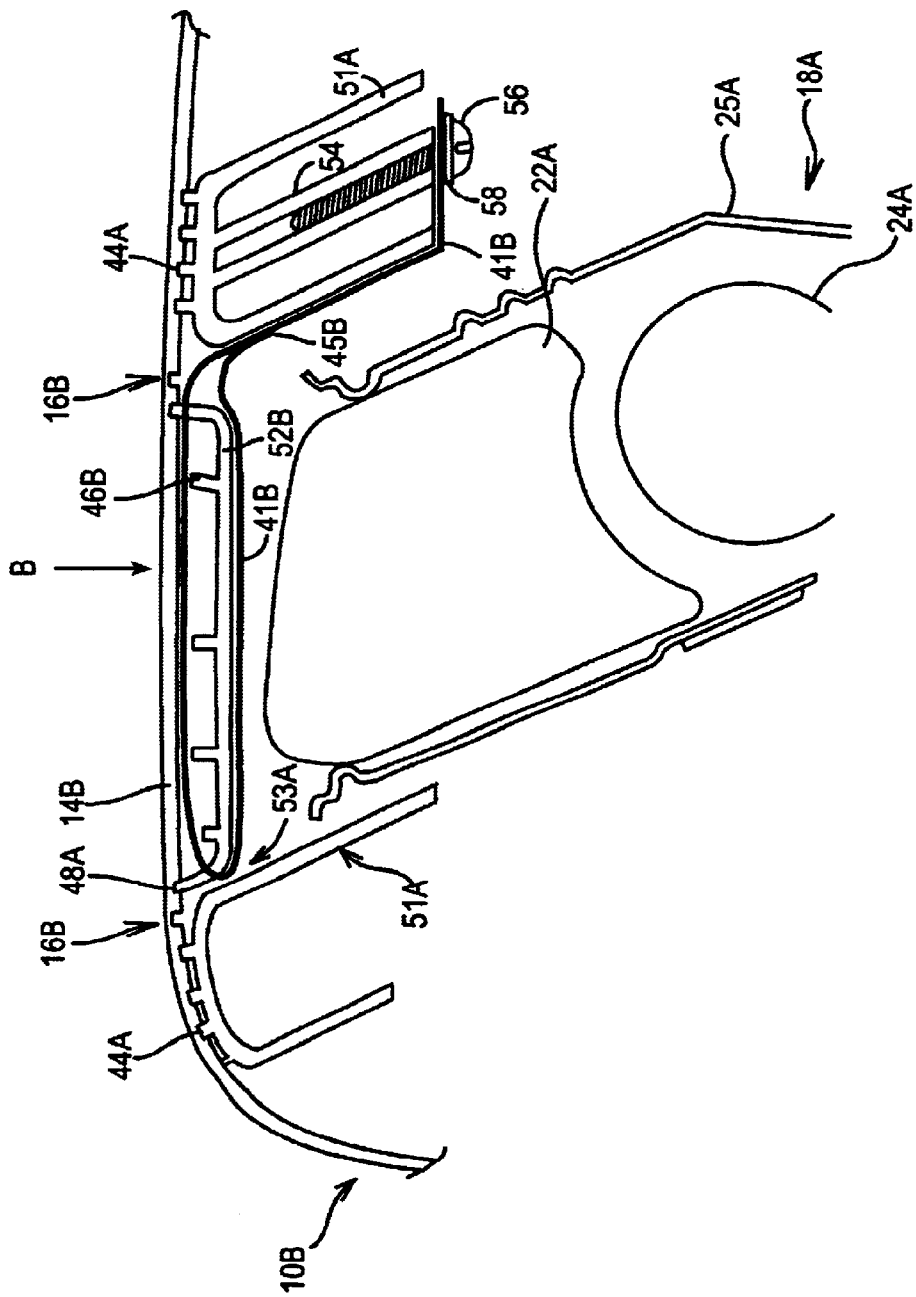
FIG. 2B is an alternate attachment embodiment of FIG. 2.

An alternate securing method to the deployment chute 51 is shown in FIG. 2B. Either of the two securing methods as shown in FIGS. 2 and 2B apply equally to any of the alternate embodiments shown in FIGS. 3–6. In FIG. 2B, the tether(s) 41B are secured to the deployment chute 51A by a screw 56 and washer 58 which are engaged into a molded boss 54 which is formed as part of the molded plastic deployment chute 51A.

Figure 3:
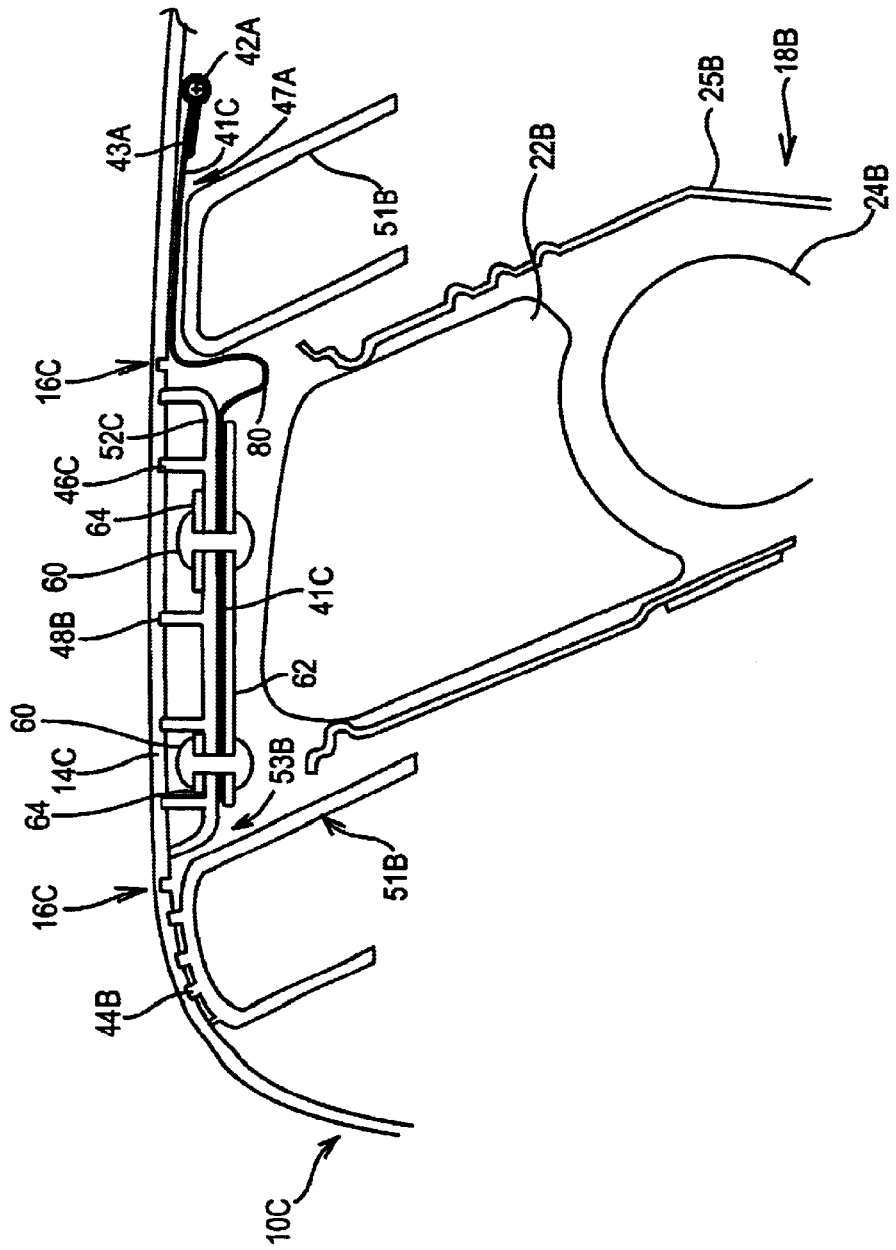
FIGS. 3–6 are enlarged sectional views taken along line A—A of FIG. 1 showing alternate embodiments for attaching a tether to an airbag door/instrument panel of the present invention.

FIG. 3 illustrates an alternate embodiment of the present invention taken, again as a sectional view of FIG. 1 looking in the direction of A—A. As illustrated herein, a tether 41C passes through a depression 47A in the deployment chute 51B and is wrapped around a rod 42A to anchor the tether at one end. The rod is configured such that it is unable to pass between the deployment chute and the panel. Accordingly, this can be adjusted to provide whatever slack one may desire for the tether upon airbag deployment, while preventing the door from traveling unrestricted in the passenger compartment of the vehicle.

The other end of the tether is attached to the reaction plate 52C via rivets 60 that pass through a metal washer 64, through the reaction plate 52C, through the tether 41C and through a reinforcement plate 62, which is preferably metallic. The reaction plate 52 and tether are thus trapped between metal surfaces 62 and 64 to ensure that there is sufficient area contacting the reaction plate to prevent tearing in case of a deployment at high temperature. The tether 41C may contain a loop of slack 80 between the reaction plate 52C and deployment chute 51B to allow the airbag door/reaction plate combination to travel out of the path of the deploying airbag 22B. The reinforcement plate 62 may comprise one plate for each tether strip 41C or be integrated into one single H-shaped reinforcement (not shown) for ease of handling in assembly but is preferably the same dimension as the flat portion of the reaction plate to provide sufficient stiffness. The washer 64 may be an H-shaped piece of stock metal that fits between the ribs 46C of the reaction plate 52C.

Figure 4:
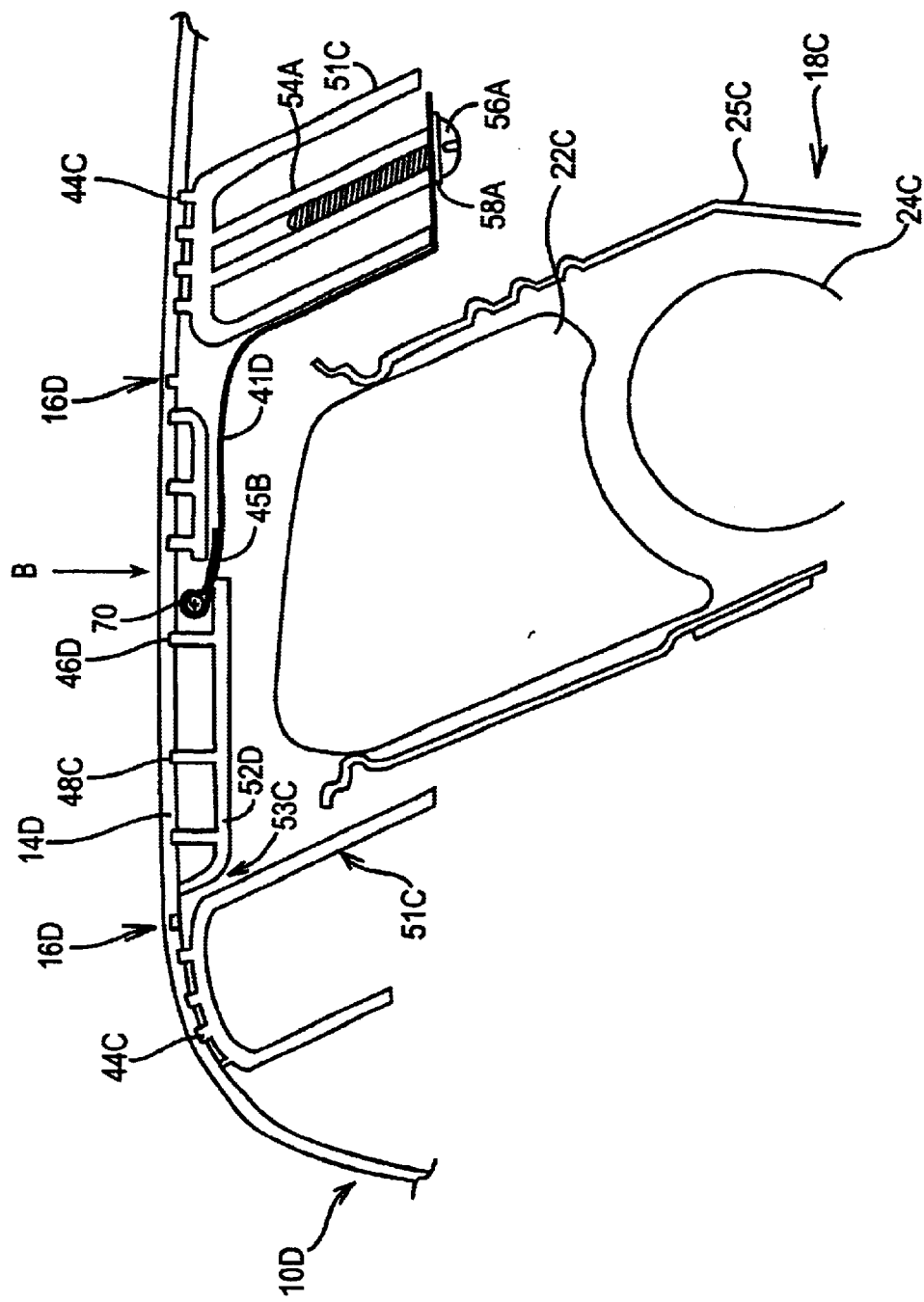

Turning to FIG. 4, another embodiment of the present invention is illustrated wherein a tether 41D is wrapped around a metal rod 70 which is located between ribs 46D in the reaction plate 52D. The tether 41D is fed through slots molded in the reaction plate 52D to wrap around a metal rod 70 and stitched back upon itself at 45B. The rod is therefore slidably engaged between the ribs 46D in the reaction plate 52D. This allows the airbag door to travel a defined distance commensurate with the amount of slidable engagement provided by the ability of the rod to move within the ribs. Accordingly, as illustrated in FIG. 4's cross-sectional view, and in FIG. 4B, the reaction plate 52D is vertically offset to create a slot 50 in the reaction plate for the tether to pass through and attach to itself when secured about the metal rod 70. The other end of the tether 41D is secured to the deployment chute 51C by either as shown in FIG. 2, by passing the tether through a depression in the chute, passing around a metal rod and stitching or otherwise attaching the tether to itself or as shown in FIGS. 2B and 4, by a screw attached to a boss in the deployment chute.

Figure 4A:
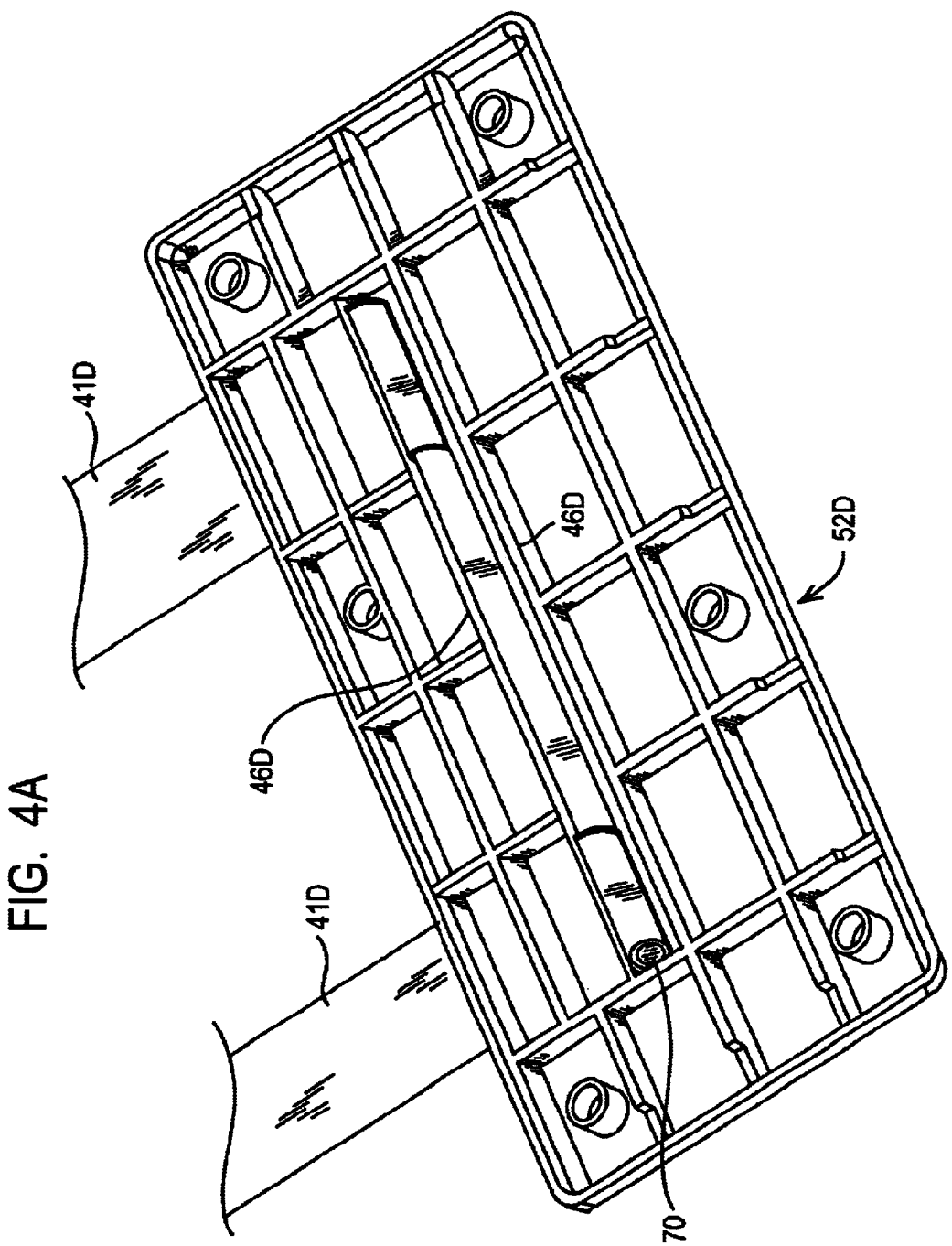
FIG. 4A is a plan view of FIG. 4.
Figure 4B:
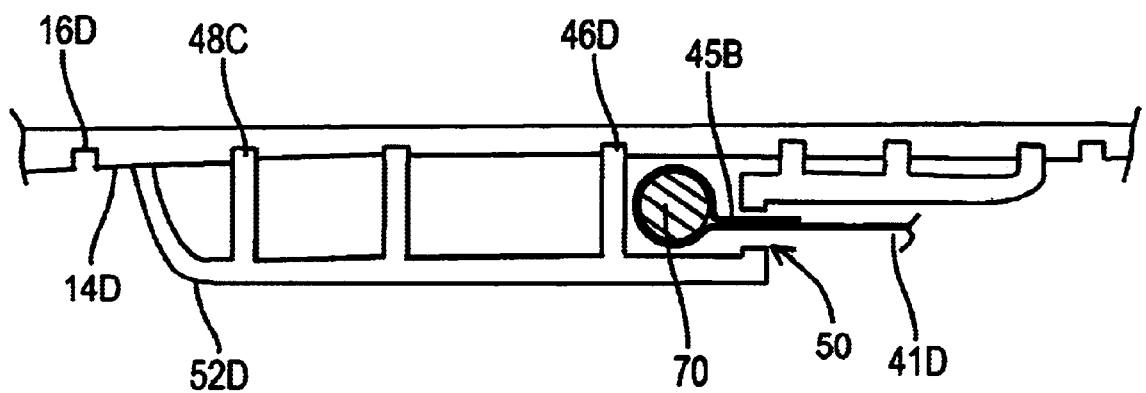
FIG. 4B is an exploded view of the reaction plate of FIG. 4.

FIG. 4A is a plan view looking in the direction of Arrow B in FIG. 4 of the rod 70 placed between ribs 46D of the reaction plate 52D and wrapped with the tether 41D. The rod may loosely fit between the ribs to allow some slack in the tether assembly.

Figure 5:
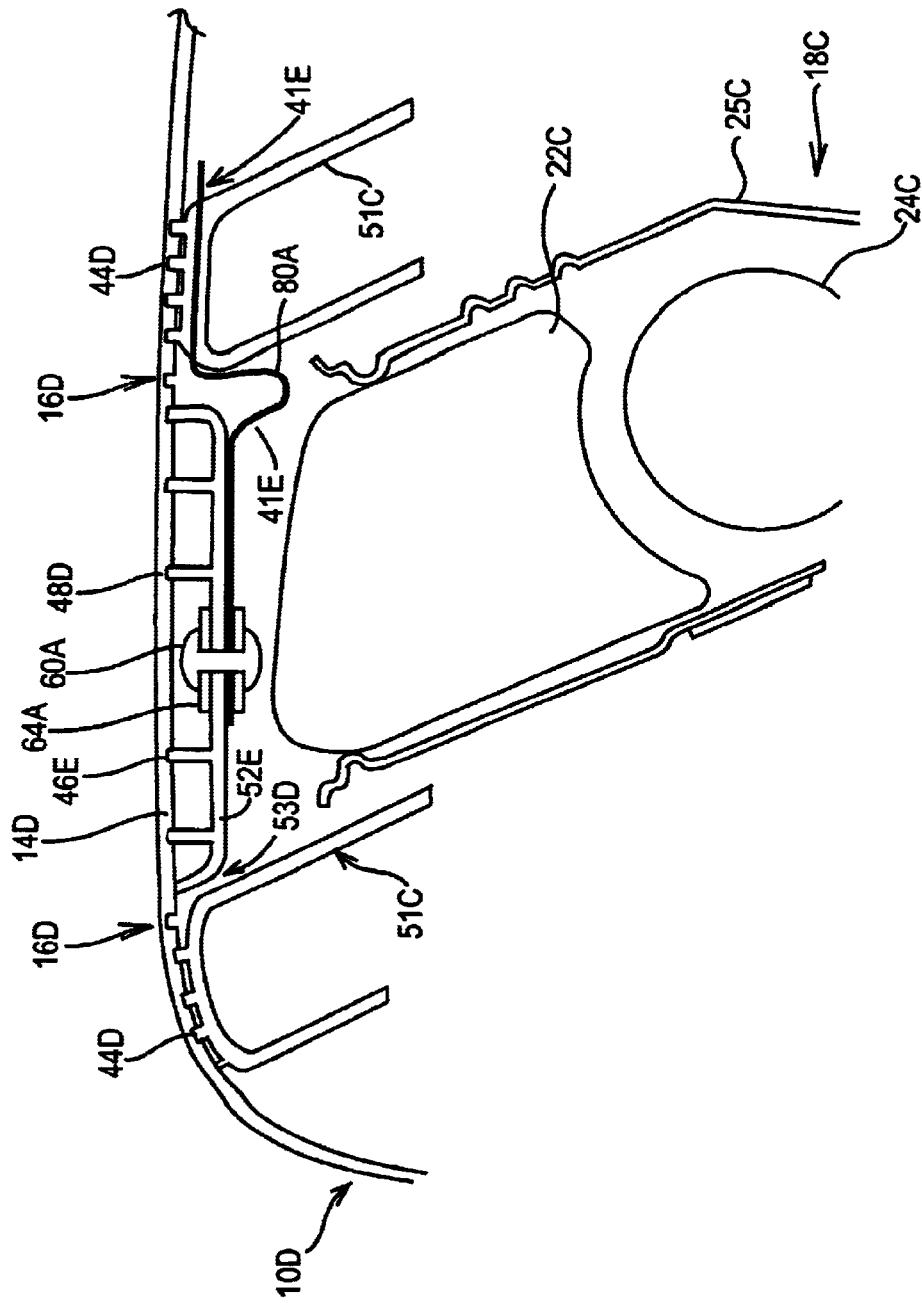

Turning to FIG. 5, still another embodiment of the present invention is illustrated. In this alternate embodiment a tether 41E is insert-molded into the deployment chute 51C during the injection molding process to attach one end of the tether securely to the chute. The tether 41E may contain some slack or a loop 80A. The other end of the tether is attached to the reaction plate using washers 64A and a rivet 60A. This arrangement provides an efficient construction to retain the airbag door 14D/reaction plate 52E welded assembly in a controlled manner when the airbag 22C deploys.

Figure 6:
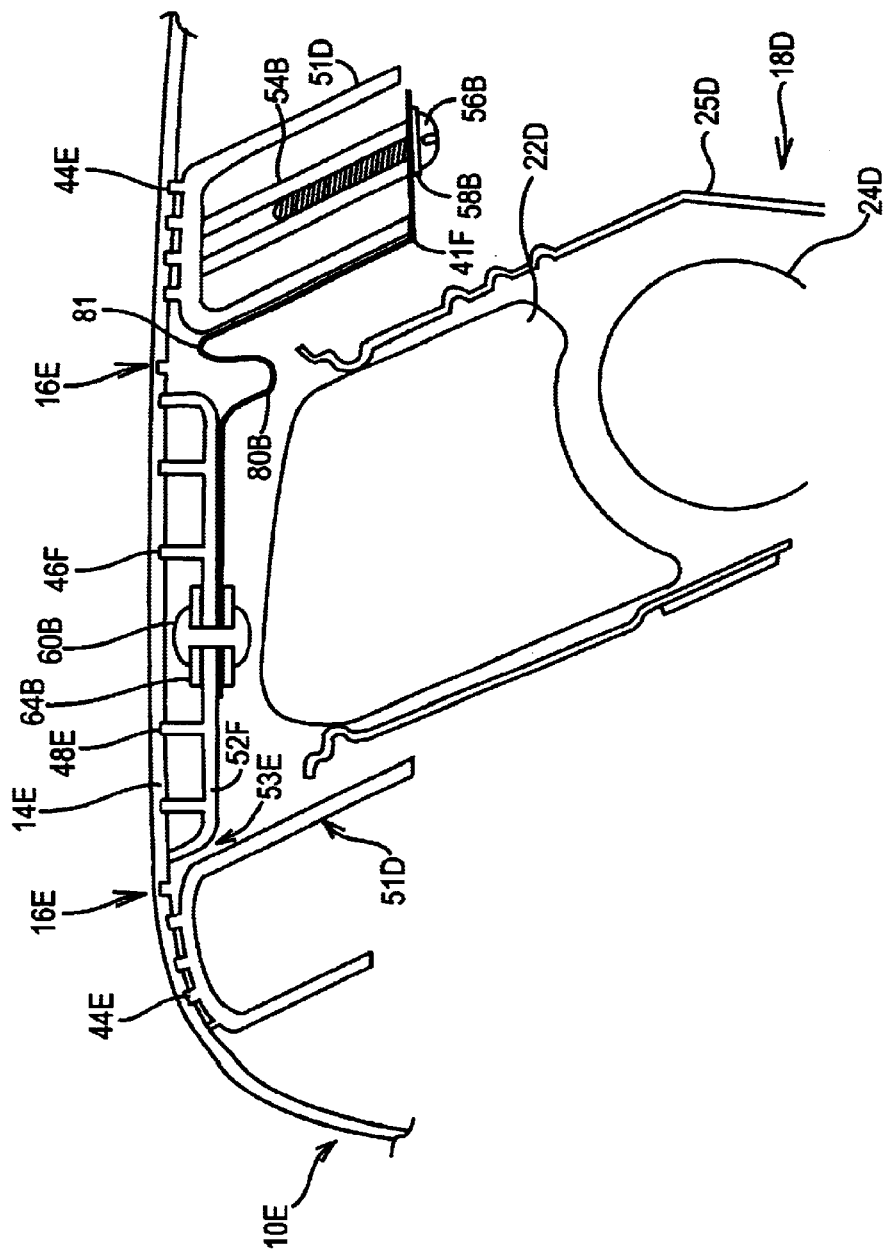

In a still further embodiment, FIG. 6 illustrates a metal tether 41F which may contain a formed loop 80B and which is attached to the reaction plate 52F by a rivet 60B and washers 64B and to the deployment chute 51D by a fastener 56B screwed into a boss 54B. The washers may be an H-shaped piece of stock that fits between the ribs of the reaction plate. The metal tether 41F may be a steel stamping formed to shape and alternatively may comprise a series of holes or slots in the stamping in the area of the loop 80B to assist in hinging of the tether to control airbag 14E/reaction plate 52F travel. The formed loop 80B may comprise one or more loops disposed between the reaction plate 52F and the deployment chute 51D to create the desired amount of slack for the deploying door. In addition, the loop itself can be selectively positioned at the open space under the area of reduced cross section 16E as shown inn FIG. 6. Alternatively, the loop may be selectively positioned adjacent the fastener 56B. Typically, the tether(s) will be a metal stamping of steel approximately 200 mm wide by 0.6 mm in thickness. Preferably, the tether will be the same width as the reaction plate to provide a predictable deployment result at high temperature and extend through a bent section 81 to be anchored at the deployment chute.

Thus, the tether constructions disclosed herein when combined with a molded deployment chute/door reaction plate provide a unique and reliable control mechanism for an airbag door system, resulting in improved assembly and manufacturing as well as improved deployment performance.

In addition, it should be noted herein that with respect to all the various embodiments herein disclosed and illustrated it should be appreciated that the various options and preferred configurations may all be exchanged between each embodiment, as the case may be, to maximize the performance of the controlled tether configuration. disclosed herein.

This description and drawings illustratively set forth the presently preferred invention embodiments. The description and drawings are intended to describe these embodiments and not to limit the scope of the invention. Those skilled in the art will appreciate that still other modifications and variations of the present invention are possible in light of the above teaching while remaining within the scope of the following claims. Therefore, within the scope of the claims, one may practice the invention otherwise than as the description and drawings specifically show and describe.

What is claimed is:

1. An airbag door construction for airbag deployment comprising:

a hard instrument panel having an integrally formed airbag door, said airbag door having an area of reduced cross-section outlining at least a portion of the periphery thereof;

a reaction plate attached to the underside of said panel at said airbag door location including a slot;

a deployment chute attached to the underside of said panel, said deployment chute attached to said panel in at least a portion of an area lying just outside of said area of reduced cross-section;

a tether assembly wherein said assembly comprises a tether having two ends wherein the first end passes through said slot and is attached to a rod wherein said rod is located between said reaction plate and said airbag door, including reinforcing ribs in the reaction plate wherein said rod is slidably engaged between said ribs in said reaction plate and wherein said second end of said tether is secured to limit travel of said airbag door whereupon airbag deployment said airbag door and said reaction plate may at least partially detach from said instrument panel and be retained by said tether.

2. The tether assembly of claim 1, wherein said rod may be solid or hollow.

3. The rod of claim 2, wherein said rod comprises metal.

4. The tether of claim 1, wherein said tether is attached to said rod by wrapping said tether around said rod and attaching said tether to itself.

5. The tether assembly of claim 1, wherein said second end of said tether is secured to said deployment chute wherein said deployment chute has formed depressions and said tether passes through said depressions in said deployment chute and wraps around a rod and attaches said tether to itself.

6. The tether assembly of claim 1, wherein said second end of said tether is secured to said deployment chute by insert-molding said second end of said tether into said deployment chute.

* * * * *